United States Patent Office 3,655,883
Patented Apr. 11, 1972

3,655,883
WATER SOLUBLE MAGNESIUM-ALUMINUM ANTACID COMPOSITION
Alphonse Peter Granatek and Edmund Stanley Granatek, Baldwinsville, and Peter Angelo Ratto, Syracuse, N.Y., assignors to Bristol-Myers Company, New York, N.Y.
No Drawing. Filed May 6, 1968, Ser. No. 727,081
Int. Cl. A61k 27/00
U.S. Cl. 424—157                  7 Claims

ABSTRACT OF THE DISCLOSURE

Nontoxic aqueous antacid solutions can be prepared by mixing in water a nontoxic magnesium salt, a nontoxic aluminum salt, gluconic acid and sodium or potassium lactate in proportions of about two gram-atoms of aluminum, about two moles of gluconic acid and about two-tenths of a mole of sodium or potassium lactate for each gram-atom of magnesium. A most preferred antacid composition is prepared by mixing the ingredients together in water in a molar ratio of 1.6 moles of gluconic acid per liter, 1.6 moles of aluminum hydroxide per liter, 0.8 mole of magnesium hydroxide per liter and 0.18 mole of sodium lactate per liter.

BACKGROUND OF THE INVENTION (1) Field of the invention

This invention relates to novel nontoxic water soluble antacid compositions having good buffering capacity and a complete lack of systemic toxicity, i.e., no systemic acidosis or alkalosis. This composition is particularly useful in the treatment of gastric hyperacidity in man.

(2) Description of the prior art

Many antacid compositions are described in the art. Water soluble antacid compositions are described by Grossmith in U.S. Pat. 3,200,136, and by Poole, Ziegler and Dugan in the Journal of Pharmaceutical Sciences, vol. 54, No. 4, April 1965, p. 651. The use of sodium lactate as a corrective for systemic acidosis is described in Merck Index, sixth edition, p. 882 (1952).

SUMMARY OF THE INVENTION

This invention relates to and has for its object the provision of a nontoxic water soluble antacid composition preferably prepared by mixing the ingredients together in water in a molar ratio of 1 part magnesium hydroxide, two parts aluminum hydroxide, two parts gluconic acid and two-tenths parts sodium lactate.

This invention relates to compositions useful in antacids. More particularly, this invention relates to an antacid composition containing magnesium hydroxide, aluminum hydroxide, gluconic acid and sodium lactate, said composition causing neither systemic acidosis or alkalosis when mixed together in the proportions of the invention.

It is well-known that gastric hyperacidity results from excessive secretion of gastric hydrochloric acid and that this effect endangers the mucous lining of the somach. Ulceration of the gastric and duodenal mucosas may result from prolonged action of excess hydrochloric acid. However, reduction of the normal percentage of gastric hydrochloric acid in the stomach by the excess use of alkalizing agents is also disadvantageous since it may result in gastric acid rebound.

Persons suffering from duodenal ulcers usually secrete large quantities of highly acidic gastric juices. Therefore, it is highly desirable than an antacid composition be provided which will instantly provide a buffering action to a desirable pH (i.e., about 3 to 5) and will maintain this pH in the stomach for an extended period of time.

Common neutralizing agents for excess stomach acid include magnesium oxide, aluminum hydroxide, magnesium hydroxide, (i.e., milk of magnesia), bismuth salts, calcium carbonate, etc. These preparations are suspensions of insoluble substances and are generally unpalatable due to their flavor and rough texture. Moreover, many of these preparations present problems of sedimentation upon standing and therefore require vigorous shaking for resuspension before use. In addition, they are prone to form deposits on the thread of the bottle causing difficulties in opening and closing.

It is an object of this invention to provide a novel composition which is useful as a buffer antacid. It is another object of this invention to provide a novel composition which may be used as an antacid and which, upon oral administration of a reasonable dose, provides an instant buffering action at a desirable pH and which will maintain this desirable pH in the stomach for at least one hour. It is a further object of this invention to provide an aqueous antacid solution which presents no problem of sedimentation on standing for long periods of time and, therefore, does not require resuspension before use. It is still another object of this invention to provide buffer antacid compositions which are more palatable than antacid compositions heretofore known and which produces neither acidosis or alkalosis.

The objects of the present invention have been achieved, by the provision according to the present invention, of the process for the preparation of a nontoxic aqueous antacid solution which comprises mixing in water a nontoxic magnesium salt, a nontoxic aluminum salt, gluconic acid and sodium or potassium lactate in proportions of about two gram-atoms of aluminum, about two moles of gluconic acid and about two-tenths of a mole of sodium or potassium lactate for each gram-atom of magnesium.

Preferably the antacid solution of the present invention is prepared by mixing in water a nontoxic magnesium salt selected from the group consisting of magnesium hydroxide, magnesium carbonate, magnesium gluconate and magnesium oxide, a nontoxic aluminum salt selected from the group consisting of aluminum hydroxide and aluminum isopropoxide, gluconic acid and sodium or potassium lactate in proportions of about two gram-atoms of aluminum, about two moles of gluconic acid and about two-tenths of a mole of sodium or potassium lactate for each gram-atom of magnesium.

More preferred, the antacid composition is prepared by mixing the ingredients together in water in a molar ratio of about 1.80 to 2.2 moles of gluconic acid, about 1.80 to 2.2 moles of aluminum hydroxide, about 0.9 to 1.1 moles of magnesium hydroxide and about 0.17 to 0.26 mole of sodium lactate.

Most preferred, the antacid composition is prepared by mixing the ingredients together in water in a molar ratio of 1.6 moles of gluconic acid per liter, 1.6 moles of aluminum hydroxide per liter, 0.8 mole of magnesium hydroxide per liter and about 0.18 mole of sodium lactate per liter.

An also preferred embodiment is the solid antacid prepared by the removal of substantially all the water from the above described solutions of the present invention.

The compositions of this invention may be used in peptic ulcer therapy either alone or in combination with other ingredients.

Flavors, sweetening agents and coloring agents may be added and the reaction mixture may be diluted by the addition of water to provide a solution having a suitable concentration, for example, about 0.6 to 1.0 molar based on the magnesium cation content. Alternatively, the product may be recovered as a solid by removing the water by evaporation or lyophilization followed by oven drying. The solid may be tabletted; or it may be encapsulated into gelatin capsules by conventional means; or it may be redissolved in water to provide a solution of the desired concentration. The antacid composition of this invention may be formulated along with an analgesic compound such as aspirin and/or acetyl p-aminophenol into various dosage forms such as an effervescent, soluble type tablet or powder for resuspension.

The advantages of the antacid compositions of this invention can be sumarized as follows:

(1) It has high acid consuming power as well as a buffering capacity which is both rapid and protracted in the physiologically desirable pH range of approximately 3 to 5.

(2) This product has the neutralization speed of sodium bicarbonate without the danger of acid rebound and alkalinization associated with the latter. Further, it does not evolve carbon dioxide in exerting its effect.

(3) Since antacids are customarily taken after a meal, the solution has a greater potential for penetrating the acid chyme present in the stomach than a suspension of solids. Thus, it can provide faster achievement of the environment desired at the ulcer crater.

(4) It is instantly available for neutralization and is not dependent upon the slow breakdown of solid particles by the attacking acid as are suspensions.

(5) It retains its neutralization capacity at elevated temperatures which is not the case with most antacid suspensions.

(6) It is extremely palatable and completely devoid of the "chalkiness" inherent in antacid suspensions.

(7) It can be instantly dispersed in milk and is potentiated in neutralization activity by this medium. Many antacid suspensions have reduced neutralization under these conditions.

(8) It is not affected by freezing as are the suspensions.

(9) Coating action can be attained by use of the product in milk. This would also apply to most antacid suspensions.

(10) There are no problems of sedimentation, thus the product is always instantly available for use without shaking.

(11) The product can be dispensed in a small mouth bottle since it does not thicken with age as many suspensions do. There is further advantage in the small mouth bottle since the restricted aperture will lessen the chance of contamination by microoragnisms during use.

(12) The solution lends itself to the design of a measured dosage dispenser which can be carried by the patient.

(13) It requires no fluids of any kind to facilitate the ingestion of a dose.

(14) The product may contain no sucrose and has an extremely low sodium content so there should be no restrictions on its use.

(15) This is the first solution of the popular antacids aluminum and magnesium hydroxide.

(16) The solution lends itself to continuous drip administration through a nasal catheter for the treatment of a patient with duodenal ulcer where continuous drip therapy is often used. Proper adjustment and control of administration of antacid suspensions presents many difficulties.

The antacid compositions of this invention are quite palatable when taken orally. Moreover, they provide instant buffering action and maintain a pH of from about 3 to about 5 in the stomach for a prolonged period of time. Due to the high solubility in water of the antacid composition, a large amount of it may be dissolved in a small volume of water thereby providing high buffering capacity with a low volume of antacid composition. Moreover, it will not result in over alkalizing when administered at therapeutic dosage. Furthermore, aqueous solutions of this compound are stable and may be stored for long periods of time without sedimentation occurring or loss of buffering activity.

The novelty of the present invention as compared to other antacids of the prior art resides in a combination of the following features:

(1) Solubility in water;
(2) Non-astringency;
(3) Nontoxic; ability to be an effective antacid without causing systemic acidosis or alkalosis;
(4) Prolonged duration of antacid activity;
(5) Pharamceutical elegance; including its pleasant taste and prolonged stability and
(6) Lack of absorption of aluminum and magnesium cations into the blood.

While all of the above features provide the novelty of the present invention, the feature that most distinguishes the product from that of the most closely related prior art is the lack of side effects, i.e., no systemic acidosis or alkalosis produced on single dose or repeated dose administration.

For experimental purposes, a variety of formulations were formulated and tested "in vivo" for their antacid effect. All contain about 0.8 mole per liter of magnesium hydroxide, about 1.6 moles per liter of aluminum hydroxide and about 1.6 moles per liter of gluconic acid. The formulations differ only in the amount of sodium or potassium lactate present.

Formula I.—5% sodium lactate

Per 120 ml., grams
Gluconic acid _____ 38.416
Aluminum hydroxide _____ 13.72
Magnesium hydroxide _____ 5.601
Lactic acid _____ 4.970
Sodium hydroxide _____ 2.130
Water, q.s. 120.00 ml.

Formula II.—2% sodium lactate

Grams
Gluconic acid _____ 38.416
Aluminum hydroxide _____ 13.72
Magnesium hydroxide _____ 5.601
Lactic acid _____ 1.988
Sodium hydroxide _____ 0.854
Water, q.s., 120.00 ml.

Formula III.—2.3 potassium lactate

Grams
Gluconic acid _____ 38.416
Aluminum hydroxide _____ 13.72
Magnesium hydroxide _____ 5.601
Lactic acid _____ 1.988
Potassium hydroxide _____ 1.198
Water, q.s. 120.0 ml.

Formulations I, II and III were administered to dogs to determine their systemic effect as shown in Table I.

TABLE I.—BLOOD pH and PLASMA $CO_2$ COMBINING POWER IN DOGS FOLLOWING ORAL DOSES OF A SOLUBLE BUFFER ANTACID

| | | | | | Pre-dose | | Dose weeks— | | | |
| | | | | | | | 1 | | 2 | |
| Group | Dog No. | Sex | Weight (kg.) | Formulation tested (8 ml./kg./day) | Blood pH | $PCO_2$ meq./l. | Blood pH | $PCO_2$ meq./l. | Blood pH | $PCO_2$ meq./l. |
|---|---|---|---|---|---|---|---|---|---|---|
| I | 1836 | F | 9.3 | Formula II, 2% Na lactate. | 7.40 | 22.7 | 7.42 | 23.6 | 7.41 | 24.1 |
|   | 1837 | F | 6.9 |   | 7.40 | 24.6 | 7.45 | 27.2 | 7.39 | 23.4 |
|   | 1851 | M | 8.8 |   | 7.40 | 25.5 | 7.39 | 25.0 | 7.42 | 25.6 |
|   | 1852 | M | 8.1 |   | 7.40 | 23.7 | 7.45 | 23.9 | 7.41 | 22.3 |
| Average: |   |   | 8.3 |   | 7.40 | 24.1 | 7.43 | 24.9 | 7.41 | 23.8 |

TABLE I.—BLOOD pH and PLASMA CO₂ COMBINING POWER IN DOGS FOLLOWING ORAL DOSES OF A SOLUBLE BUFFER ANTACID

| Group | Dog No. | Sex | Weight (kg.) | Formulation tested (8 ml./kg./day) | Pre-dose Blood pH | Pre-dose PCO₂, meq./l. | Dose weeks— 1 Blood pH | 1 PCO₂, meq./l. | 2 Blood pH | 2 PCO₂, meq./l. |
|---|---|---|---|---|---|---|---|---|---|---|
| II | 1838 | F | 9.2 | Control (water) | 7.41 | 24.5 | 7.41 | 27.8 | 7.41 | 23.3 |
|  | 1839 | F | 10.2 |  | 7.40 | 25.3 | 7.40 | 27.1 | 7.40 | 25.0 |
|  | 1845 | M | 7.3 |  | 7.40 | 26.1 | 7.41 | 26.7 | 7.38 | 24.1 |
|  | 1848 | M | 8.9 |  | 7.42 | 25.1 | 7.43 | 27.2 | 7.39 | 22.3 |
| Average: |  |  | 8.9 |  | 7.41 | 25.2 | 7.41 | 27.2 | 7.41 | 23.7 |
| III | 1859 | F | 9.0 | Formula III, 2.3% K lactate. | 7.40 | 26.8 | 7.48 | 26.4 | 7.39 | 25.6 |
|  | 1861 | F | 8.5 |  | 7.39 | 26.3 | 7.49 | 27.5 | 7.39 | 24.4 |
|  | 1855 | M | 14.2 |  | 7.44 | 27.5 | 7.49 | 25.2 | 7.40 | 24.5 |
|  | 1858 | M | 12.6 |  | 7.40 | 24.4 | 7.49 | 24.3 | 7.48 | 24.0 |
| Average: |  |  | 11.1 |  | 7.41 | 26.2 | 7.49 | 25.8 | 7.41 | 24.6 |
| IV | 1836 | F | 9.5 | Formula I, 5% Na lactate, | 7.40 | 23.0 | 7.49 | 25.5 | 7.49 | 27.1 |
|  | 1837 | F | 7.0 |  | 7.38 | 23.7 | 7.48 | 26.2 | 7.46 | 26.9 |
|  | 1851 | M | 8.6 |  | 7.39 | 25.1 | 7.49 | 29.8 | 7.41 | 27.3 |
|  | 1852 | M | 8.0 |  | 7.42 | 23.3 | 7.46 | 26.2 | 7.40 | 24.4 |
| Average: |  |  | 8.5 |  | 7.40 | 23.8 | 7.48 | 26.9 | 7.44 | 26.4 |

The data as summarized in Table I indicates that Formula II has little, if any, systemic effect in dogs. Conversely, Formula I containing 5% sodium lactate produces an uncompensated alkalosis. The $CO_2$ combining power of the blood was increased after administration of Formula I. The $CO_2$ combining power of the blood after Formula II remained normal. (Clinical Diagnosis by Laboratory Methods, Davidsohn-Wells, 13th edition, p. 475).

Another study was conducted under slightly different conditions to determine the systemic effect of Formula IV.

Formula IV

Per 120 ml., grams
Gluconic acid _____ 38.416
Aluminum hydroxide _____ 13.72
Magnesium hydroxide _____ 5.601
Water, q.s., 120.00 ml.

Included in the study was a formulation known commercially as "Glymaxil," which is described as a solution of the complex known as sodium

glucaldrate-Na[Al(OH)₂C₆H₁₀O₇]

The solution contains 0.4 grams of the complex per milliliter. The product is designated as Formula V. (U.S. Pat. 3,200,136, Example 21.)

the present invention has little or no system effect in mammals, including man.

Clinical tests were conducted on human male and female volunteers utilizing Formulas II and IV.

Formula IV was studied in several groups of human volunteers according to the following regimen:

Group I:
  5 females—60 ml. daily for 30 days
Group II:
  5 females—120 ml. daily for 30 days
Group III:
  5 females—40 ml. daily for 30 days
Group IV:
  2 females, 3 males—80 ml. daily for 30 days
Group V:
  5 males—20 ml. daily for 30 days
Group VI:
  5 males—40 ml. daily for 30 days
Group VII:
  5 males—200 ml. daily for 10 days In all groups (5 subjects each) the average serum $CO_2$ combining power fell from control values of 23–25 meq./1 to 18–22 meq./l. The same pattern was repeated in a group of 5 subjects receiving 200 ml. of Formula IV daily TABLE II.—BLOOD pH AND PLASMA CO₂ COMBINING POWER IN DOGS FOLLOWING ORAL DOSES OF A SOLUBLE ANTACID

| Dog No. | Sex | Formulation | Pre-dose Blood pH | Pre-dose PCO₂, meq./l. | 5 weeks 2 ml./kg./day pH | 5 weeks 2 ml./kg./day CO₂ | 7 weeks 4 ml./kg./day pH | 7 weeks 4 ml./kg./day CO |
|---|---|---|---|---|---|---|---|---|
| 1851 | M | Formula IV | 7.39 | 25.3 | 7.29 | 23.0 | 7.35 | 22.4 |
| 1852 | M |  | 7.37 | 24.7 | 7.30 | 22.9 | 7.32 | 21.9 |
| 1836 | F |  | 7.43 | 23.7 | 7.30 | 21.2 | 7.20 | 21.2 |
| 1837 | F |  | 7.43 | 26.0 | 7.31 | 24.2 | 7.30 | 22.1 |
| 1848 | M | Water control | 7.40 | 25.4 | 7.39 | 25.0 |  |  |
| 1845 | M |  | 7.43 | 25.1 | 7.38 | 24.5 |  |  |
| 1839 | F |  | 7.36 | 23.3 | 7.31 | 25.6 |  |  |
| 1838 | F |  | 7.40 | 25.0 | 7.30 | 23.6 |  |  |
| 1855 | M | Formula V | 7.41 | 23.8 | 7.31 | 24.0 | 7.38 | 23.3 |
| 1858 | M |  | 7.38 | 24.3 | 7.28 | 23.2 | 7.25 | 22.7 |
| 1859 | F |  | 7.38 | 24.6 | 7.31 | 23.2 | 7.30 | 22.2 |
| 1861 | F |  | 7.40 | 24.4 | 7.30 | 24.7 | 7.32 | 23.4 |

As illustrated in Table II, Formula IV in the absence of any sodium lactate produces an uncompensated acidosis in dogs.

Formula V also causes an uncompensated acidosis. This is more apparent from the $CO_2$ values than from the blood pH.

Systemic acidosis in mammals is usually characterized by rapid respiration and sometimes stupor.

Systemic alkalosis is characterized by slow respiration and sometimes convulsions and tetany. As such it is extremely important for a safe and efficent antacid to have little or no systemic effect. The preferred formulation of for 10 days. In 26 available subjects from the original 35, one month after the end of the study the $CO_2$ combining power values had returned to their respective control levels.

There was no significant effect on the following blood or serum values in any subject: white blood cell count (including differential), hemoglobin, hematocrit, urinalysis, fasting blood sugar, thymol turbidity and blood urinary nitrogen.

It can be concluded that Formula IV produces a lowering of the average serum $CO_2$ combining power, i.e., acidosis.

Formula II was studied in several groups of human volunteers according to the following regimen:

Group I:
  10 patients—200 ml. daily for 28 days
Group II:
  10 patients—100 ml. daily for 28 days
Group III:
  10 patients—60 ml. daily for 28 days
Group IV:
  10 patients—20 ml. daily for 28 days
Group V:
  10 patients—200 ml. $H_2O$ daily for 28 days There was no appreciable change in the average serum $CO_2$ combining power of any of the groups receiving Formula II. The control serum $CO_2$ combining power was in the range of 27.0 to 29.1 meq./l. The subject values range was 27.3 to 29.7 meq./l.

There was no significant effect on white blood cell count, hemoglobin, hematocrit, urinalysis, fasting blood sugar, thymol turbidity or blood urinary nitrogen.

The antacid composition of the present invention does not cause systemic acidosis or alkalosis when administered in quantities up to 200 ml./day.

A preferred embodiment of the present invention is the antacid composition prepared by mixing together in water the ingredients in the molar ratio of about 1.80 to 2.20 moles of gluconic acid, about 1.80 to 2.20 moles of aluminum hydroxide, about 0.9 to 1.1 moles of magnesium hydroxide and about 0.17 to 0.26 mole of sodium lactate or potassium lactate.

Another preferred embodiment is a dried antacid composition prepared by evaporating the formulation described above. The resulting powder is ideal for reconstitution into a liquid dosage form or for tabletting by formulation with the proper diluents commonly used in the art.

A more preferred embodiment of the present invention is the antacid composition comprised of about 1.45 to 1.75 moles of gluconic acid per liter, about 1.45 to 1.75 moles of aluminum hydroxide, about 0.7 to 0.9 mole of magnesium hydroxide per liter and about 0.16 to 0.22 mole of sodium lactate per liter plus other pharmaceutical adjuvants.

A most preferred embodiment is the liquid antacid composition having the formula:

Gluconic acid (100%)—320.120 grams
Aluminum hydroxide, N.F.—sufficient material to be equivalent to 81.597 grams $Al_2O_3$
Magnesium hydroxide (100%), N.F.—46.673 grams
Lactic acid (100%)—16.574 grams
Sodium hydroxide—7.120 grams
Sweetening agents, qs.
Sodium cyclamate, qs.
Preservatives, qs.
Coloring, qs.
Flavor, qs.
Deionized water, q.s., ad 1.0 liter.

Another most preferred embodiment is the dried antacid composition prepared by evaporating, lyophilizing or precipitating the above formulation to produce a dry powder. The resulting powder is ideal for reconstitution into a liquid dosage form or for tabletting by formulation with the proper diluents commonly used in the art.

One liter of antacid composition of the present invention is prepared by the following basic steps:

(1) Dissolve the gluconic acid in about 500 ml. water.
(2) Slowly add the magnesium hydroxide with agitation.
(3) Slowly add the aluminum hydroxide with agitation.
(4) Slowly add the lactic acid with agitation.
(5) Slowly add the sodium hydroxide which had been previously dissolved in about 100 ml. of water.
(6) Continue stirring with heating to 90° C. to 100° C. until a solution results.
(7) Dilute with water to about 900 ml.
(8) Add decolorizing charcoal and filter aid. Filter.
(9) Add water through filter mat to make one liter volume.

Other ingredients such as coloring agents, sweetening agents, preservatives and flavors may be added to the solution prior to adding water to bring the volume up to 1 liter.

Alternatively, the antacid mixture may be freeze-dried, spray-dried or precipitated to obtain solid product. The solid material thus obtained may then be compressed into tablet form as a regular or buffer antacid chewable tablet; or filled into a capsule; or it may be reconstituted with water.

The antacid composition of this invention may also be prepared by mixing one mole of magnesium gluconate, which is commercially available, with two moles of wet or dry gel reactive aluminum hydroxide; or by mixing equimolar amounts of gluconic acid and reactive aluminum hydroxide and then mixing two moles of the product with one mole of magnesium hydroxide, magnesium oxide or magnesium carbonate. The product may also be prepared by mixing equimolar amounts of aluminum isopropoxide and glucono-delta-lactone and then mixing two moles of the product with one mole of magnesium hydroxide. The desired amount of lactate salt may be added as such or may be generated "in situ" by the addition of equimolar quantities of lactic acid and sodium or potassium hydroxide to achieve the desired molar ratio.

The antacid composition of this invention may be used in peptic ulcer therapy either alone or in combination with other ingredients. The compound of this invention can be used in combination with an antispasmodic such as aminopentamide or belladonna alkaloids; an anti-secretory; a tranquilizer such as reserpine or meprobamate; an antiflatulent such as methylpolysiloxane; a protective coating agent such as an alkali soluble hydrophylic colloid, (e.g. carboxymethyl cellulose, alginates, carboxypolymethylene, cellulose acetate phthalate); a sedative such as phenobarbital; a local anesthetic such as 2-diethylamino-2',6'-aceto-xylidide; most of these agents have been used in combination with other standard antacids.

The composition of this invention may be used for other than peptic ulcer therapy. Thus, it may be used in conjunction with any chemotherapeutic agents which are likely to cause irritation to the gastric mucosas upon oral ingestion such as, for example, aspirin, quinine, etc. This compound may be used with other chemotherapeutic agents where buffering action will enhance absorption of the drug upon oral ingestion.

The antacid composition of this invention, either alone or in combination with other active ingredients, may be used in conjunction with suitable pharmaceutical carriers. The carrier may be either a solid or a liquid and the antacid compositions may be in the form of aqueous solutions, tablets or capsules. Thus, as previously described, the antacid composition may be prepared in situ in the aqueous reaction medium without recovering it. Flavors, sweetening agents and coloring agents may be added and the reaction mixture may be diluted by the addition of water to provide a solution having a suitable concentration, for example, about 0.6 to 1.0 molar based on the magnesium cation content. Alternatively, the product may be recovered as a solid. It may be tabletted; or it may be encapsulated into gelatin capsules by conventional means; or it may be re-dissolved in water to provide a solution of the desired concentration.

The antacid compositions of this invention are quite palatable when taken orally. Moreover, they provide instant buffering action and maintain a pH of from about 3 to about 5 in the stomach for a prolonged period of time. Due to their high solubility in water a large amount of it may be dissolved in a small volume of water thereby providing high buffering capacity with a low volume of antacid composition. Moreover, it will not result in overalkalizing when administered at therapeutic dosage. Furthermore, aqueous solutions of this compound are stable and may be stored for long periods of time without sedimentation occurring or loss of buffering activity.

In order to determine the buffering capacity of the most preferred solution, 5 ml. portions of the solution prepared as described above were titrated by the following procedure.

Hydrochloric acid (25.0 mls. of 0.100 N) is placed in a 100 ml. beaker. Stirring is initiated and the pH is determined. There is then added the portion of the antacid solution to be titrated and the pH is determined after 1, 3, 5 and 10 minutes have elapsed. Subsequently, at each ten-minute interval thereafter, 1.00 ml. of 1.00 N hydrochloric acid is added, the pH being determined immediately before the addition of the acid at each interval. This procedure is followed until the pH drops below 3. Titration is run at room temperature (25° C.) and a moderate rate of stirring is maintained throughout the procedure. The results are as follows:

| Time (minutes): | pH (5 ml. portion) |
|---|---|
| 0 | 1.13 |
| 1 | 5.78 |
| 3 | 5.85 |
| 5 | 5.88 |
| 10 | 5.92 |
| 20 | 5.50 |
| 30 | 5.02 |
| 40 | 4.61 |
| 50 | 4.27 |
| 60 | 4.00 |
| 70 | 3.76 |
| 80 | 3.57 |
| 90 | 3.42 |
| 100 | 3.29 |
| 110 | 3.14 |
| 120 | 3.03 |
| 130 | 2.95 |
| 140 | |

In the treatment of conditions and diseases in man in which the use of an antacid is desirable, the antacid composition of the present invention is usually taken orally in doses of 20 ml. to 300 ml. per day, but preferably in oral doses of 5 ml. to 30 ml. four to six times a day.

When administered in solid form, i.e., powder, tablets, capsules, etc., the amount of antacid administered per day is preferably equivalent to the quantity found in 20 ml. to 300 ml. of the solution.

The following examples illustrate, but do not limit the modes of preparation of the antacid compositions of the present invention.

DESCRIPTION OF THE PREFERRED EMBODIMENTS

EXAMPLE 1

Gluconic acid (100%)—320.120 grams
Aluminum hydroxide, N.F.—Sufficient material to be equivalent to 81.597 grams $Al_2O_3$
Magnesium hydroxide (100%) N.F.—46.673 grams
Lactic acid (100%)—16.574 grams
Sodium hydroxide (100%)—7.120 grams
Sweetening agents, q.s.
Preservatives, q.s.
Coloring, q.s.
Flavor, q.s.
Deionized water q.s. ad 1.00 liter (1) Add the gluconic acid containing approximately 500 ml. of deionized water to a sterilized tank.

(2) Add the magnesium hydroxide (suspension will heat up to 40° C.–50° C.) slowly with agitation.

(3) Slowly add the aluminum hydroxide with continued agitation.

(4) Add the lactic acid as a 50% w./v. solution with continued agitation.

(5) Slowly add the sodium hydroxide which has been previously dissolved in deionized water (10% of final batch volume) with continued agitation.

(6) Maintain agitation and heat to 90° C.–100° C.

(7) Hold at 90° C.–100° C. with stirring until a hazy yellow brown solution is obtained (approximately 1 hour).

(8) Add 0.5% (w./v.) batch volume of decolorizing charcoal at 100° C. and agitate for 24 hours without heating.

(9) Dilute to 90% of final batch volume with deionized water.

(10) Add 1.0 (w./v.) batch volume of inorganic filter aid and agitate for ½ hour.

(11) Filter through sterile filter into sterile tank.

(12) Rinse filter with balance of deionized water (10% of batch volume).

(13) Use water from Step No. 12 to dissolve sweetening agent and preservative agents.

(14) Heat batch from Step 11 to 80° C. with agitation and add material from Step No. 13.

(15) Add flavoring to the batch.

(16) Utilizing air pressure, the heated solution is passed through sterilized equipment and through a sterilizing filter.

(17) The resulting filtrate is collected in a sterilized tank, mixed well, and cooled to room temperature.

(18) With agitation, the dyes are added to the batch.

(19) After agitation, the batch is passed through a sterilized filter to remove lint.

(20) The resulting colored solution is filled into bottles.

EXAMPLE 2

| | Per 120 ml. |
|---|---|
| Gluconic acid, technical 50% grade. | Sufficient material to be equivalent to 38.416 grams of 100% gluconic acid. |
| Aluminum hydroxide, N.F. dried gel. | Sufficient material to be equivalent to 9.792 grams of aluminum oxide. |
| Magnesium hydroxide, N.F. powder. | 5.601 grams. |
| Lactic acid 50% food grade | Sufficient material to be equivalent to 1.98888 grams of pure lactic acid. |
| Sodium hydroxide pellets | 0.8544 gram. |
| Sweetening agents | Quantity sufficient. |
| Preservative agents | Do. |
| Coloring | Do. |
| Flavoring | Do. |
| Deionized water, quantity sufficient. to. 120 ml. | |

Prepare as described in Example 1.

EXAMPLE 3

A mixture of gluconic acid, approximately 50% aqueous solution (45,080 grams) in about ten liters of distilled water is heated with agitation to 90° C. Magngesium hydroxide powder (3,262 grams), is then slowly added with agitation. During the addition of magnesium hydroxide the temperature of the reaction mixture rises to about 103° C. Lactic acid, 50% food grade, equivalent to 1160.18 gram pure lactic acid is added with stirring. Sodium hydroxide, 498.4 grams, dissolved in 7.0 liters of water is added with agitation. The temperature is maintained for about 15 minutes at which time a clear solution is obtained. There is then slowly added, with agitation, aluminum hydroxide dry gel (11,550 grams) and the temperature is maintained at about 90° C. for about one hour. There is then added activated carbon (1,400 grams) and sufficient distilled water to bring the volume of the mixture to 70 liters. Subsequently, 2.1 kg. of filter aid is added and the mixture is agitated for about ten minutes at a temperature of from 70–80° C. The mixture is then filtered and to the filtrate there is added, if desired, preservatives, sweetening agents and flavors. The mixture is stirred until a solution is obtained and it is then filtered. The pH of the filtrate is 7.72. The solution is quite palatable and may be stored for a long period of time without sedimentation.

A 5 cc. portion of this solution is titrated by the procedure described previously to determine the buffering capacity of the antacid solution. The results are as follows:

Time (minutes): pH
0 ............................................. 1.28
1 ............................................. 5.52
3 ............................................. 5.58
5 ............................................. 5.62
10 ............................................ 5.64
20 ............................................ 5.11
30 ............................................ 4.64
40 ............................................ 4.25
50 ............................................ 3.93
60 ............................................ 3.68
70 ............................................ 3.48
80 ............................................ 3.32
90 ............................................ 3.19
100 ........................................... 3.07
110 ........................................... 2.93

EXAMPLE 4

Gluconic acid, approximately 50% aqueous solution, (1,413 grams) is mixed with aluminum hydroxide dry gel (266.9 grams) with stirring. Magnesium hydroxide (99.75 grams) is slurried in 600 ml. of water and added slowly to the mixture. Lactic acid, 50% food grade, equivalent to 33.148 grams of 100% lactic acid is added with stirring. Sodium hydroxide, 14.24 grams, dissolved in 200 ml. water, is added with agitation. Activated carbon (30 grams) is added and the volume of the mixture is adjusted to two liters. The mixture is heated slowly to 90° C. and heating is continued for one-half hour. Subsequently, the mixture is cooled to room temperature (25° C.), centrifuged to remove the carbon and filtered. To 1500 mls. of the filtrate there are added, if desired, preservatives and sweetening agents. The mixture is heated to 60° C. to dissolve the ingredients and cooled to room temperature. The solution is then filtered and to 1200 mls. of the filtrate there are added, if desired, flavors and dyes. There is thereby obtained a clear solution having a pH of 7.62. A 5 ml. portion of this solution is titrated as previously described. The pH after ten minutes is 5.74 and the pH after 100 minutes is 3.02.

EXAMPLE 5

Aluminum isopropoxide (12.3 grams; 0.06 mole) is added to 80 cc. of distilled water with stirring. There is then added glucono-delta-lactone (10.7 grams; 0.06 mole) with stirring and the solution is heated to 85° C. and maintained at that temperature for 45 minutes. After the first 25 minutes of heating, 25 cc. of distilled water are added to help effect solution. Subsequently, there is added magnesium hydroxide (1.752 grams; 0.03 mole) and the mixture is heated to 85° C. with stirring. This temperature is maintained for 45 minutes and an additional 50 cc. of distilled water are added to effect solution. Sodium lactate was added (0.672 gram, 0.006 mole). The solution is filtered while still warm to remove unreacted magnesium hydroxide, and the filtrate is centrifuged. At this point, the pH is 7.0. The solution is then azeotropically distilled with methyl isobutyl ketone at a temperature of 50° C. and the resultant solids are dried in a vacuum oven at 40° C. The weight of the finished product is 13.2 grams. This product is screened with a 40-mesh screen. A 30% solution of the finished product is prepared by dissolving 3 grams of product in sufficient wate to make 10 cc. of solution.

Another portion of the product is formulated into a 45.5% solution by dissolving 4.55 grams of the product in sufficient water to give 10 cc. total volume. A 5 cc. portion of each of these solutions is titrated by the procedure described in Example 1 to determine the buffering capacity of the antacid solutions. The results are as follows:

| Time (minute): | pH (30% solution) | pH (45.5% solution) |
|---|---|---|
| 0 | 1.30 | 1.25 |
| 1 | 3.65 | 4.40 |
| 3 | 3.80 | 4.50 |
| 5 | 3.90 | 4.50 |
| 10 | 4.05 | 4.60 |
| 20 | 3.65 | 4.15 |
| 30 | 3.30 | 3.80 |
| 40 | 3.05 | 3.55 |
| 50 | | 3.30 |
| 60 | | 3.20 |
| 70 | | 3.00 |

EXAMPLE 6

Magnesium gluconate (811.08 grams) is added to aluminum hydroxide wet gel (14.7% $Al_2O_3$) (1912 grams), the mixture is heated to form a suspension and heating is continued until a solution is obtained. Sodium lactate is added (22.4 g., 0.2 mole). Preservatives are added and the mixture is cooled to 60° C. There are then added sweetening agents and the mixture is cooled to 25° C. There are then added flavors and dyes. The volume of the solution is then adjusted to two liters by the addition of water and the solution is filtered. The pH of the filtrate is 7.55. A 5 ml. portion of the filtrate is titrated as described in Example 1 to determine the buffering capacity of the antacid solution. The results are as follows:

Time (minutes): pH
0 ............................................. 1.23
1 ............................................. 5.36
3 ............................................. 5.52
5 ............................................. 5.70
10 ............................................ 5.72
20 ............................................ 5.20
30 ............................................ 4.74
40 ............................................ 4.34
50 ............................................ 4.02
60 ............................................ 3.76
70 ............................................ 3.56
80 ............................................ 3.38
90 ............................................ 3.20
100 ........................................... 3.02
110 ........................................... 2.90

EXAMPLE 7

Magnesium gluconate (165.6 grams) is mixed with aluminum hydroxide dry gel (62.4 grams). The mixture is added to 400 mls. of water an dthe aqueous mixture is heated to 90° C. After reaction, the solution is filtered. Sodium lactate is added (4.48 grams, 0.04 mole). The pH of the filtrate is 7.82. A 5 cc. portion of this solution is titarted by the procedure described in Example 1 to determine the buffering capacity of the antacid solution. The pH does not fall below the level of 3.00 until after 110 minutes.

EXAMPLE 8

Aluminum hydroxide dry gel (267 grams) is blended with magnesium hydroxide (99.7 grams). The mixture is then added to approximately 50% aqueous gluconic acid (1493 grams) and the mixture is heated in a boiling water bath for two hours. Sodium lactate is added (7.17 grams, 0.064 mole). Preservatives and sweetening agents are added and the mixture is cooled. The mixture is then filtered and the filtrate is collected. The filtrate is determined to have a pH of 7.7. A 5 cc. portion of the filtrate is titrated by the procedure described in Example 1 to determine the buffering capacity of the antacid solution. The pH does not fall below the level of 3.0 until after 110 minutes.

EXAMPLE 9

Aluminum hydroxide (31.2 grams) is added to an approximately 50% aqueous solution of gluconic acid (156.8 grams). The mixture is maintained at 60° C. in a water bath until the aluminum hydroxide is neutralized. Magnesium oxide (8.06 grams) is added and the reaction mixture is maintained at 60° C. until a solution is obtained. Sodium lactate is added (0.448 gram, 0.004 mole). The solution is then cooled to room temperature and sweetening agents are added. The volume is then adjusted by the addition of water to 200 mls. and the solution is filtered. The filtrate has a pH of 7.39. A 5 cc. portion of the filtrate is titrated by the procedure previously described to determine the buffering capacity of the antacid solution. The pH does not fall below the level of 3.0 until after 110 minutes.

EXAMPLE 10

Aluminum hydroxide (31.2 grams) is suspended in an approximately 50% aqueous solution of gluconic acid (156.96 grams). The mixture is stirred without heating until a solution is obtained. Magnesium oxide (11.66 grams) is made into a slurry and the slurry is added to this solution at room temperature. The reaction mixture is then heated in a water bath to 80° C. until a solution is obtained. Sodium lactate is added (6.05 grams, 0.054 mole). Sweetening agents are added to the hot solution. The solution is cooled to room temperature and the volume is adjusted to 200 mls. by the addition of water. The solution is filtered. To 50 ml. of the filtrate there are added flavors and dyes. The pH of the solution is 7.20. A 5 cc. portion of this solution is titrated by the procedure described in Example 1 to determine its buffering capacity. The pH does not fall below the level of 3.0 until after 100 minutes.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. The process for the preparation of a nontoxic aqueous antacid solution which comprises mixing in about 1 liter of water a nontoxic magnesium salt selected from the group consisting of magnesium hydroxide, magnesium carbonate, magnesium gluconate and magnesium oxide, a nontoxic aluminum salt selected from the group consisting of aluminum hydroxide and aluminum isopropoxide, gluconic acid and sodium or potassium lactate in proportions of about two gram-atoms of aluminum, about two moles of gluconic acid and about two-tenths of a mole of sodium or potassium lactate for each gram-atom of magnesium.

2. The process of claim 1 which comprises mixing the ingredients together in water in a molar ratio of about 1.80 to 2.2 moles of gluconic acid, about 1.8 to 2.2 moles of aluminum hydroxide, about 0.9 to 1.1 moles of magnesium hydroxide and about 0.17 to 0.26 mole of sodium lactate.

3. The process of claim 1 which comprises mixing the ingredients together in water in a molar ratio of about 1.45 to 1.75 moles of gluconic acid per liter, about 1.45 to 1.75 moles of aluminum hydroxide per liter, about 0.7 to 0.9 mole of magnesium hydroxide per liter and about 0.16 to 0.22 mole of sodium lactate per liter.

4. The process of claim 1 which comprises mixing the ingredients together in water in a molar ratio of 1.6 moles of gluconic acid per liter, 1.6 moles of aluminum hydroxide per liter, 0.8 mole of magnesium hydroxide per liter and about 0.18 mole of sodium lacetate per liter.

5. The solid antacid composition prepared by the process of claim 1.

6. The antacid solution prepared by the process of claim 1.

7. The process of claim 2 which includes the further step of removing substantially all the water to produce a solid antacid composition.

References Cited

UNITED STATES PATENTS

| 3,200,136 | 8/1965 | Grossmith et al. | 260—439 |
| 3,272,703 | 9/1966 | Rubino et al. | 424—156 |
| 3,279,997 | 10/1966 | Schneyer | 424—317 |

OTHER REFERENCES

The Merck Index, 6th edition, 1952, page 463.

ALBERT T. MEYERS, Primary Examiner

D. M. STEPHENS, Assistant Examiner

U.S. Cl. X.R.

424—154, 156, 317